US006208790B1

United States Patent
Zopf et al.

(10) Patent No.: US 6,208,790 B1
(45) Date of Patent: Mar. 27, 2001

(54) ULTRA VIOLET LIGHT CURABLE POLYMER MATRIX FOR TIGHT-BUFFERING OPTICAL FIBERS

(75) Inventors: Richard F. Zopf, Charlotte, NC (US); Brian D. Thiffault, Courtice (CA)

(73) Assignee: The Stewart Group, Inc., Ontario (CA)

( * ) Notice: Subject to any disclaimer, the term of this patent is extended or adjusted under 35 U.S.C. 154(b) by 0 days.

(21) Appl. No.: 09/239,404

(22) Filed: Jan. 28, 1999

(51) Int. Cl.[7] ....................................................... G02B 6/02
(52) U.S. Cl. .......................... 385/128; 385/126; 385/127; 385/143; 385/145; 427/163.2
(58) Field of Search .................................... 385/105, 114, 385/122–128, 145, 141, 143, 142, 144; 427/163.2

(56) References Cited

U.S. PATENT DOCUMENTS

| 4,370,023 | 1/1983 | Lange et al. | 350/96.23 |
|---|---|---|---|
| 4,705,571 | 11/1987 | Lange et al. | 106/287.1 |
| 4,752,997 | 6/1988 | Freeman et al. | 29/402.18 |
| 4,839,970 | 6/1989 | Goetze et al. | 350/96.23 |
| 5,146,531 | * 9/1992 | Shustack | 385/128 |
| 5,187,763 | 2/1993 | Tu | 385/113 |
| 5,218,011 | 6/1993 | Freeman | 523/173 |
| 5,256,705 | 10/1993 | Freeman | 523/173 |
| 5,264,251 | 11/1993 | Guersen et al. | 427/389.9 |
| 5,336,563 | 8/1994 | Coady et al. | 428/375 |
| 5,384,342 | 1/1995 | Szum | 522/172 |
| 5,412,022 | 5/1995 | Andres et al. | 524/535 |
| 5,461,195 | 10/1995 | Freeman et al. | 174/23 R |
| 5,502,145 | 3/1996 | Szum | 528/28 |
| 5,527,835 | 6/1996 | Shustack | 522/42 |
| 5,538,791 | 7/1996 | Shustack | 428/392 |
| 5,587,403 | 12/1996 | Shustack | 522/42 |
| 5,595,820 | 1/1997 | Szum | 428/378 |
| 5,664,041 | 9/1997 | Szum | 385/128 |

FOREIGN PATENT DOCUMENTS

| 0049156 | 4/1982 | (EP) . |
|---|---|---|
| 0353251 | 12/1992 | (EP) . |
| 0466230 | 11/1995 | (EP) . |
| 0464918 | 10/1996 | (EP) . |
| 0632301 | 4/1997 | (EP) . |

OTHER PUBLICATIONS

Clyburn et al; A Dry Core Loose Tube Cable for Outside Environments; 1995; 29–36.
Gallard et al; Significan Improvement of Loose Tube Cable Spliceability Based on New Cable Dry Design; 1996; 353–357.
Bringuier et al; Reliability of Dry Waterblocking Materials; 1996; 779–787.
Clyburn et al; A New Generation Craft–Friendly Cable for Outside Environments; 1996; 359–364.

* cited by examiner

Primary Examiner—Phan T. H. Palmer
(74) Attorney, Agent, or Firm—Bourque & Associates, PA

(57) ABSTRACT

The present invention provides an improved optical fiber tight buffermaterial. The improved material is a ultraviolet (UV) light curable polymer matrix, which is applied to optical fibers and is substantially instantaneously cured, in-place at ambient temperatures. The use of the disclosed UV-light curable tight buffermaterial allows for greatly increased optical fiber buffering operations and provides an improved end product, which does not exhibit any significant optical signal loss after an optical fiber is coated according to the invention.

8 Claims, 4 Drawing Sheets

ULTRA VIOLET LIGHT CURABLE POLYMER MATRIX FOR TIGHT-BUFFERING OPTICAL FIBERS

FIELD OF THE INVENTION

The present invention relates to fiber-optic cables. More particularly, the present invention relates to a single component, ultra violet light curable polymer matrix, which is applied to an optical fiber and is cured thereon to form a tight buffer surrounding the optical fiber.

BACKGROUND OF THE INVENTION

Typically, one or more optical fiber leads for the transmission of optical signals or lightwaves are disposed within a protective casing to define an optical fiber transmission cable. Each optical fiber serves as a light waveguide and typically consists of a fiber that is coated to protect and preserve the strength of the optical fiber, to prevent damage during handling and to prevent environmental conditions from attacking the glass fiber. In addition, coatings are applied to decrease the microbending of optical fibers, which can reduce their efficiency in transmitting optical signals.

A typical optical fiber is shown in FIG. 1. The optical fiber 1, includes a central, fiber optic glass core 2, through which optical signals or light waves are transmitted. The glass material used to manufacture the core has a high refractive index, which is conductive to optical signal transmission.

Surrounding the core 2 is a layer of glass cladding 4, which is made from a glass material having a low refractive index. The glass cladding 4 is designed to refract the optical signals being transmitted through the central glass core 2 back into the core to allow them to be efficiently transmitted through the length of the fiber optic cable.

The glass cladding 4 is surrounded by a primary coating 6, which is preferably made of a highly elongated silicone, urethane or like material, which has a low modulus. The purpose of the primary coating 6 is to distribute any stresses applied to the exterior of the optical fiber around the circumference of the fiber. Since external stresses that are applied to an optical fiber and in particular, stresses that are applied to a single point on a fiber seriously effect the transmission of optical signals therethrough, the primary coating 6 acts as a "cushion" of sorts to minimize optical signal losses.

However, materials that provide the required stress distribution and cushioning characteristics for primary coatings do not offer adequate handling and abrasion resistance characteristics. In fact, typical primary coating materials would easily release from the optical fiber cladding if they were merely handled by an installer or maintenance technician. Therefore, in order to maintain the primary coating 6 in place around the raw optical fiber, a secondary coating 8 is applied on top of the primary coating. The secondary coating 8 is made out of a material that provides adequate handling and abrasion resistance characteristics. Typically, secondary coatings are made out of polyepoxy acrylates or like materials.

Additionally, since fiber optic cables typically include more than one optical fiber, many optical fibers are color-coded to aid in installation and splicing operations. Thus, secondary coating materials are manufactured in a variety of colors.

One or more coated fibers are then typically surrounded by a protective sheath to form a buffer. Optical fibers may be either in a tube but "loose" or "tight" buffered. In a loose buffer tube, an example of which is shown in FIG. 2 and is generally designated as 10, there is a substantial volume 12 intermediate an optical fiber 1 and the buffer tube sheath 14. This volume is typically filled with a gel-type buffer tube filling material 16, which allows the optical fiber(s) 1 to "float" within the buffer tube 10. This greatly reduces the stresses applied to the optical fibers, themselves, as the buffer tube is handled during manufacturing, installation, operation and maintenance processes.

On the other hand, in a tight-buffered optical fiber 20 (FIG. 2A), substantially the entire volume within the buffer tube 24, is occupied by an optical fiber 1 and no gel-type filling compound is employed. The buffer tube is designed to provide environmental protection for the optical fiber and to provide the necessary spacing between fibers to allow fiber optic cables to be installed and spliced using industry-standard connectors.

Since the materials used to date to form buffer tubes are typically opaque thermoplastic materials, in order to conform to the color-coding requirements of the individual optical fibers, prior art buffer tube materials are, likewise, color-coded. As can be appreciated, since optical fibers are manufactured in up to 24 different colors, manufacturers of tight-buffered fiber and manufacturers of fiber optic cables must manufacture and stock a like number of buffer tube thermoplastics. This, of course, creates manufacturing and stocking concerns.

A typical, prior art manufacturing line useful for producing thermoplastic tight buffer coatings to optical fibers is shown in FIG. 3. The manufacturing line 50 begins with a supply of optical fiber 1, which is provided to the line from an optical fiber payoff 52. A guide 53 ensures that the optical fiber 1 is oriented properly before it is pulled through an extrusion system 54. The extrusion system 54 is used to extrude a standard, prior art thermoplastic material around the optical fiber to form the tight-buffer. The extrusion system 54 includes an extruder 55, which melts the raw thermoplastic material into a molten state and extrudes the molten thermoplastic onto the optical fiber through a die (not shown). Since the extrusion process uses heat to melt the thermoplastic tight buffer material, following the extruder 55 is a cooling trough 56, through which the tight-buffered optical fiber passes in order to cool the buffer material back into its solid state. Once the, now tight-buffered optical fiber exits the cooling trough, it is pulled through a second, exit guide 53' by a capstan 58. The tight-buffered optical fiber is then taken up on a take-up spool 59.

Since prior art buffer materials are typically thermoplastics, and are applied using manufacturing processes similar to the one described above, there are significant startup, shutdown and maintenance issues associated with buffer tube production lines. For example, during startup, until the die used to extrude the thermoplastic buffer material is maintained at its preferred temperature for some period of time, there will be flaws in the buffer tube extrusion. Thus, an initial length of the tight-buffered optical fiber will need to be discarded. There is also the requirement that an extruded buffer must be precisely concentric with the fiber itself in order to eliminate the possibility of applying unwanted stresses to the fiber.

Additionally, if tight-buffered optical fibers are required of a different color, then the production line must be shut down and the die must be cooled and thoroughly cleaned or replaced before the line can be restarted using a different color thermoplastic tight buffer material. As can be appreciated, in addition to the waste that will be generated during the startup process, this will also cause significant delays in the production process.

Another limitation caused by prior art, thermoplastic tight buffer materials is manufacturing line speed. Typically, thermoplastic tight buffer application is limited to about 175 meters per minute. This limitation results from the very nature of thermoplastic materials. Thermoplastics are solids at ambient temperatures. In order to be applied around an optical fiber they need to be heated to between 475° F. and 575° F. in order to melt them into their liquid state. Once melted, the liquid thermoplastic materials must then be extruded around the optical fiber using an extrusion die. This process introduces shrinkage control and concentricity of extrusion issues into the equation.

Since optical fibers are generally very small in diameter, for example 250μ, small diameter dies are required. Small dies result in high sheer stresses being applied to the molten thermoplastic as it is forced therethrough. This can result in the loss of laminar flow through the die, which in turn can result in non-uniformities and inconsistencies in the resulting tight buffer. Of course, non-uniformities and inconsistencies provide a greater likelihood of optical signal transmission loss and fiber failure.

Finally, after the thermoplastic buffer tube material is applied to a fiber, it must be cooled to return the material to its solid state. This is typically accomplished in a cooling trough, where the material is gradually reduced in temperature to minimize the likelihood of flaws created by the rapid contraction of the materials as they are cooled. Thus, cooling troughs can be lengthy, which requires a great deal of space associated with tight bufferproduction lines.

Accordingly, there is a need for a tight buffermaterial that can be applied at high rates of speed, at ambient temperatures and rapidly through-cured in place on an optical fiber. Additionally, it would be especially advantageous if the tight buffermaterial were substantially transparent to allow the optical fiber color to be seen therethrough, which would eliminate the necessity to stock a plurality of different color tight buffermaterials. Finally, a "foaming" process can be used to apply the tight buffermaterial to the optical fiber, which would reduce the amount of tight buffermaterials utilized and reduce the weight and cost of the materials.

SUMMARY OF THE INVENTION

The present invention provides an improved, tight-buffered optical fiber tight buffermaterial. The disclosed tight buffermaterial comprises an ultraviolet (UV) light-curable polymer matrix, which is applied in liquid form around an optical fiber at ambient temperature. The polymer matrix is then cured in-place on the optical fiber by exposing the polymer matrix to a source of UV light. The disclosed UV curable tight buffermaterial, thus offers the versatility of ambient temperature application and rapid through cure using UV light.

The present invention further provides a method of manufacturing tight-buffered optical fibers for use in fiber optic cables. The method includes circumferentially encapsulating an optical fiber within a tight buffer tube, which comprises a substantially transparent, ultraviolet (UV) light-curable polymer matrix coating. The optical fiber is first coated with the UV light-curable tight buffermaterial of the present invention and is subsequentially cured in-place by exposing the coated fiber to a source of UV light.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENT

Figure 2:
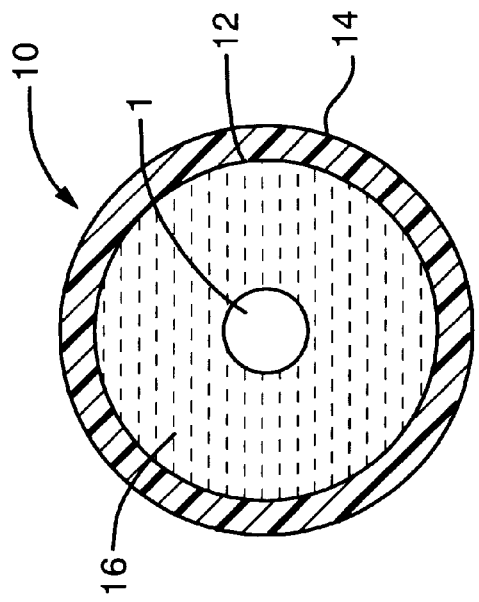
FIG. 2 is a prior art loose buffer tube showing a single optical fiber encased within the buffer tube and surrounded by a gel-type buffer tube filling material.
Figure 1:
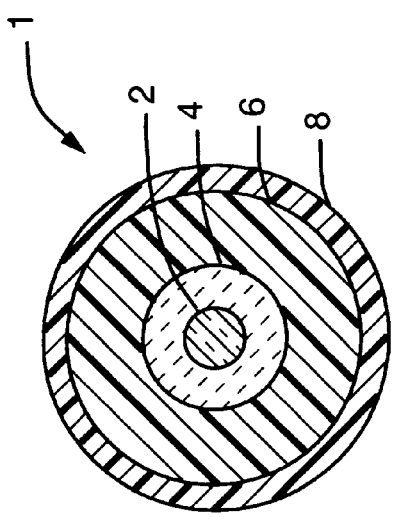
FIG. 1 is a cross-section of a prior art optical fiber showing the central glass core, the glass cladding and the primary and secondary buffer coatings.
Figure 2A:
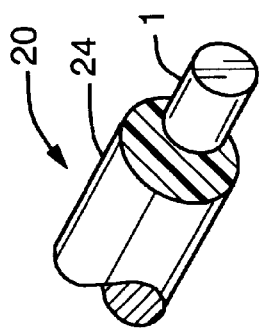
FIG. 2A shows a typical, prior art tight-buffered optical fiber.
Figure 3:
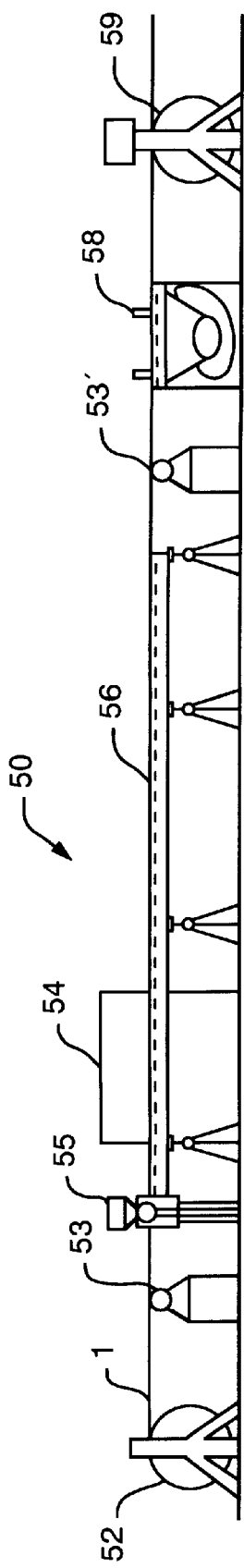
FIG. 3 is a layout of a manufacturing line used for manufacturing tight-buffered optical fibers according to the teachings of the prior art, using thermoplastic tight buffer-materials.
Figure 4:
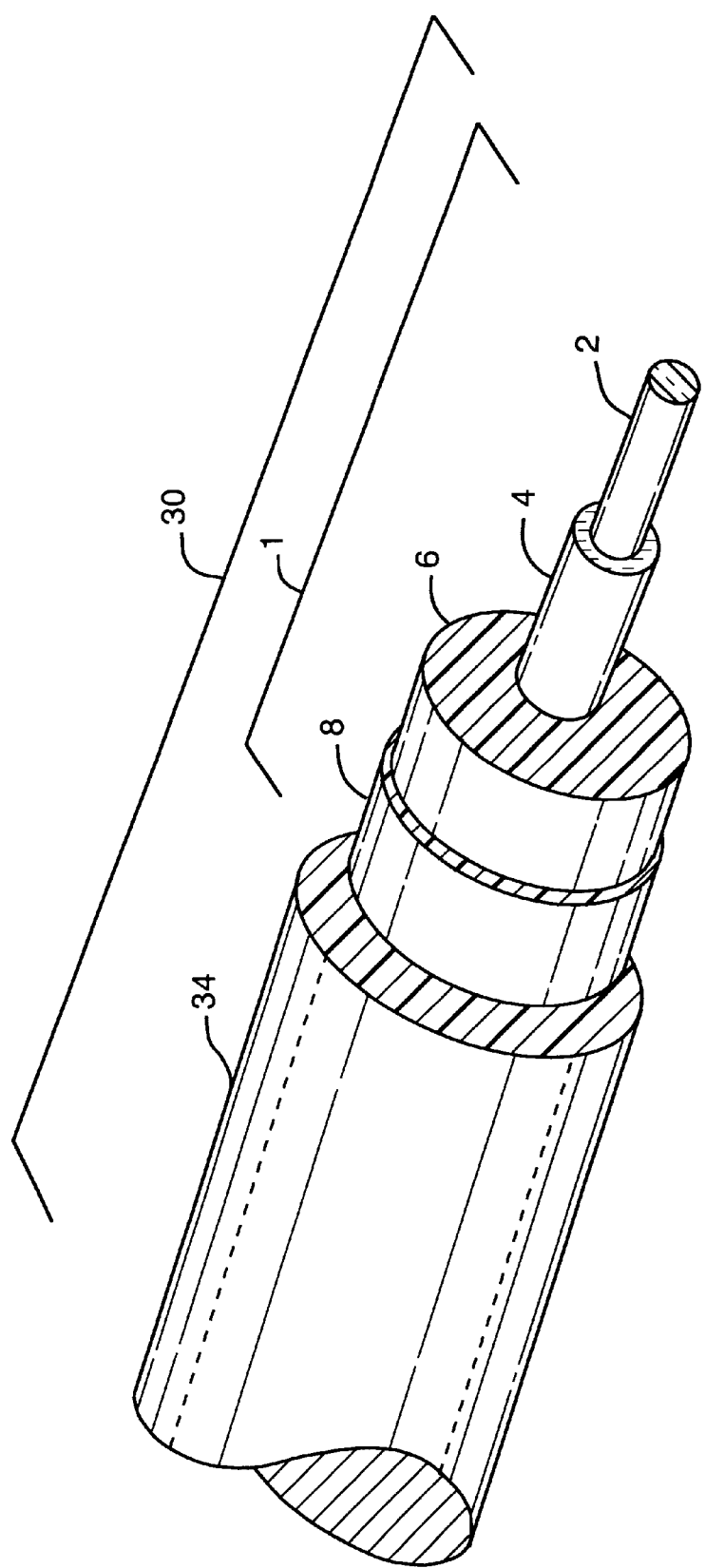
FIG. 4 is a tight-buffered optical fiber, which utilizes an ultraviolet (UV) light-curable tight buffermaterial in accordance with the teachings of the present invention.

The principles of the present invention are particularly useful in the manufacture of tight-buffered optical fibers 30 of the type illustrated in FIG. 4. The present invention begins with a standard, prior art optical fiber 1, which includes glass core 2, glass cladding 4, primary coating 6 and secondary coating 8, as described earlier with respect to FIG. 1. However, the invention departs from the current teachings of the art in the material used to form the tight buffer 34.

Instead of using thermoplastic tight buffermaterials, which must be extruded onto the optical fiber 1, the present invention employs an ultraviolet (UV) light-curable polymer matrix, which is applied to the optical fiber 1 in an un-cured, liquid state at ambient temperature. The UV curable polymer matrix may be applied using any number of prior art methods and apparatuses. It may also be mechanically or chemically "foamed", which are well known prior art processes that introduce an air, nitrogen or other inert gases into the polymer matrix to reduce the amount of material used. This reduces the weight and the cost of the resultant coated fiber. Of course, multiple fibers can be coated into multiple configurations.

The polymer matrix is then cured in-place on the optical fiber by exposing the coated fiber to a source of UV light. This results in rapid through cure of the polymer matrix, which eliminates the need to melt, extrude and then re-solidify the tight buffermaterial, as is required by the prior art.

The UV light-curable polymer matrix employed as the tight buffer material is preferably a substantially transparent polymer matrix, which allows a single material to be used to produce buffer tubes around optical fibers of any color. Thus, the need for manufacturers to stock multiple colors of thermoplastic tight buffermaterials is eliminated. Alternatively, in situations where stocking is not an issue, the UV curable polymer matrix can include small amounts of pigment, which would provide colored buffer tubes that can be applied to uncolored fibers.

In addition to the elimination of the need to stock multiple buffer materials, the use of a UV light-curable polymer matrix as the buffer material provides significant advances in the speed at which production lines can run.

As mentioned earlier, a drawback of using thermoplastics is that they must be melted and extruded through heated dies in order to be applied to optical fibers. Thermoplastics are generally heated to temperatures between 475° F. and 575° F. in order to melt the thermoplastic material into a molten material having a suitable viscosity for application. While the molten material viscosity is inversely proportional to its temperature, care must be taken not to overheat the thermoplastic material to ensure that its structure is not damaged, which could result in flaws in the finished buffer. In addition, exposing optical fibers to extreme temperatures could prove detrimental to their ultimate ability to transmit optical signals. Thus, there is a limit to the viscosity of the molten thermoplastic material as it enters the die with which it is applied to the optical fiber.

Accordingly, these relatively viscous, prior art materials exhibit high shear forces as they are extruded through the small dies that are associated with optical fiber diameters. Accordingly, in order to minimize the likelihood of inconsistencies in the final buffer tube, production line speeds are limited to around 175 meters per minute. This speed limitation is a significant limitation on the quantity of tight-buffered optical fibers that can be made.

On the other hand, since the disclosed UV light-curable polymer matrix is a liquid at ambient temperature, it does not need to be heated to be applied to the optical fiber. This results in a number of advantages to the manufacturing process and to the resulting tight-buffered optical fiber.

First, UV light-curable materials can be formulated using any number of polymeric backbones and additives, which can be adjusted to provide a highly desirable viscosity. Thus, less viscous materials can be applied to the optical fibers without the risk of damage to the materials. In addition, they can be applied in any one of a variety of manners, including but not limited to the use of wiping type applicators through which the optical fiber is drawn. In addition, they can be applied using either mechanical or chemical "foaming" processes as mentioned earlier to result in the use of less material, which would reduce the weight of the resultant, coated fiber, as well as reduce the cost of coated fiber.

Once the UV light curable polymer matrix is applied to the optical fiber, it can be cured in-place, substantially instantaneously by exposing the coated optical fiber to a source of UV light. Thus, there is little time for the coating material to drip or sag once it is applied to the optical fiber, which will result in fewer flaws or defects in the finished buffer coating. The speed at which the tight buffermaterial can be cured also limits the physical space in which the production equipment can operate, since the lengthy cooling troughs associated with prior art thermoplastic materials is eliminated.

Also, it has been realized in practice that the use of UV light-curable tight buffermaterials provides an improvement in optical signal transmissivity over prior art fibers using thermoplastic buffer tubes, especially on thermal aging. It is believed that the optical signal transmissivity degradation associated with tight buffering optical fibers using thermoplastic tight buffermaterials results from temperature-related stresses applied to the optical fiber. One type of temperature-related stress is created when the prior-art thermoplastic tight buffermaterials are applied to the optical fiber.

Additionally, since thermoplastic tight buffermaterials are applied in a molten state, when they cool in place on an optical fiber, they shrink or contract, which applies a circumferential stress or squeezing of the tight-buffered optical fiber. Any fillers or additives included in a prior art, extruded material or the inherent performance of extruded materials may further affect optical signal transmissivity, especially at low or high temperatures, which greatly effect the properties of the thermoplastic tight buffermaterials.

As explained above, since any stress applied to an optical fiber will lead to signal transmission losses, it is believed that this squeezing, however slight will adversely affect the signal transmission capabilities of the tight-buffered fiber. However, with the disclosed UV light-curable polymer matrix tight buffer material, there are no thermal transients associated with the tight-buffering process. Accordingly, those thermo-related stresses, which are experienced by prior art tight-buffered optical fibers are eliminated. Thus, tight-buffered optical fibers manufactured in accordance with the teachings of the present invention do not experience optical signal transmissivity losses.

Figure 5:
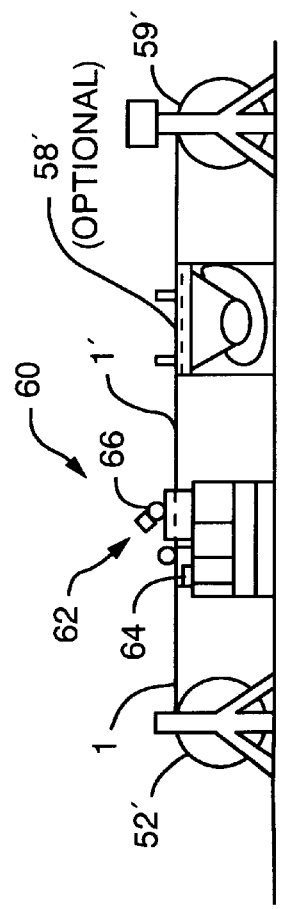
FIG. 5 is a manufacturing line layout suitable for manufacturing tight-buffered optical fibers according to the teachings of the present invention, using UV light-curable tight buffermaterials.

Turning now to FIG. 5, a production line for manufacturing tight-buffered optical fibers utilizing the UV light-curable polymer matrix tight buffermaterials taught by the present invention is shown and generally designated as 60. Production line 60 begins, like a prior art production line, with a source of raw optical fibers provided on payoff spool 52'. However, instead of requiring an extrusion system, the production line 60 includes a polymer application and curing system 62, which comprises coater 64 for coating optical fiber 1 with the UV light-curable polymer matrix of the present invention. Once fiber 1 is coated, it proceeds through curing station 66, which comprises an appropriate source of UV light. The coated fiber 1' is either pulled through the coating and curing apparatus 62 by an optional capstan 58' or, since the length of the production line using the principles of the present invention is so short compared to prior art production lines, the coated optical fiber 1' may simply be taken up on a powered take-up reel 59'. Additionally, since the length of the manufacturing line disclosed herein is substantially shorter than prior art manufacturing lines, additional guides and supports are not required. Thus, a plurality of production lines can be installed in the same space required for prior art production lines or production equipment.

Another significant advantage of the disclosed invention is that it allows for the manufacture of tight-buffered fiber optic cables at speeds substantially greater than prior art methods allow. Since thermal transients are eliminated and the tight buffermaterial of the present invention can be cured substantially instantaneously by exposing the same to a source of UV light, speeds in excess of 200 meters per minute are easily realized using the disclosed production method.

Additionally, since the UV light-curable tight buffer material is a liquid in its uncured state, it does not need to be melted. This results in less costly equipment, lower operational costs, including lower electricity usage, and lower maintenance costs. There is also virtually no loss of the UV light-curable tight buffer material during the startup and shutdown stages of the disclosed production line.

In one embodiment, the UV light-curable tight buffer material comprises substantially between 45 and 65 percent by weight of a flexible urethane acrylate. Preferably, urethane acrylates with glass transition temperatures greater than 35° C. are utilized. In the preferred embodiment, UCB urethane acrylate sold under the designation I6700 by UCB Radcure is used.

The tight buffer material further includes substantially between 12 and 25 percent by weight of a substantially monofunctional cyclic acrylate ester, such as isobornyl acrylate (IBOA). The monofunctional cyclic acrylate ester provides low shrinkage on cure and a high glass transition temperature (greater than 100° C.) when it is homo polymerized. In addition, when used in conjunction with elongative urethane acrylates, such as UCB I6700, it does not decrease the flexibility of the resulting, cured coating.

The tight buffermaterial also includes substantially between 8 and 16 percent by weight of dipropylene glycol diacrylate (DPGDA), which provides enhanced surface characteristics to the cured tight buffermaterial. Specifically DPGDA lowers the elongation of the resulting tight buffer coating, which allows the material to be stripped for splicing operations and the like.

The tight buffer material includes substantially between 3 and 5 percent by weight alkoxylated trimethylol propane triacrylate. This trifunctional material provides excellent surface cure characteristics to the resulting tight buffermaterial.

Also included in the tight buffer material is substantially between 1 and 5 percent by weight of an ultraviolet (UV) curable photoinitiator, such as KIP 150. An antioxidant, such as Irganox 1076 is also added to the material in quantities between 0.0 and 1 percent by weight in order to prevent degradation of cables incorporating such tight-buffered optical fibers.

Also included in the material is substantially between 0.5 and 3 percent by weight of an ultraviolet stabilizer to prevent yellowing of the resulting coating. In one embodiment of the invention Tinuvin 292 is used.

In another embodiment of the invention, a UV-curable silicone release compound, such as EB-350, is included in the tight buffermaterial in quantities substantially between 1 and 3 percent by weight to provide a low coefficient of friction on the resulting, cured tight buffer material. This reduces the bonding of external jacketing materials to the tight buffer material, which, again, allows for easier stripping or splicing operations. Although EB-350 is the preferred release compound, any UV-curable silicone could be equivalent. In the alternative, a secondary release coating may be applied between the tight buffer material and the fiber. Secondary release coatings of substantially 5μ are of a suitable thickness to provide the desired ease of stripping.

One preferred embodiment of the disclosed tight buffer material is provided in Table I.

TABLE I

| MATERIAL | % BY WEIGHT |
| --- | --- |
| UCB EB6700 | 58.24 |
| IBOA, SR-506 | 19.41 |
| DPGDA | 10.6 |
| TRPGDA | 3.56 |
| SR-454 | 3.0 |
| KIP-150 | 2.69 |
| TINUVIN 292 | 1.0 |
| EB 350 | 1.0 |
| IRGANOX 1035 | 0.5 |

A second embodiment of the tight buffer material is provided in Table II.

TABLE II

| MATERIAL | % BY WEIGHT |
| --- | --- |
| UCB EB6700 | 60.39 |
| IBOA | 20.12 |
| DPGDA | 11.0 |
| SB-454 | 3.11 |
| KIP-150 | 2.79 |
| TINUVIN 292 | 1.04 |
| EB-350 | 1.04 |
| IRGANOX 1035 | 0.51 |

As mentioned earlier, a pigment may be included as a colorant when the tight buffer materials are to be applied to non-colored fiber. On average, substantially between 0.2% and 0.4% and preferably 0.3% of a suitable colorant would be required to provide a desired color to either of the tight buffer materials specified in the examples provided in Tables I and II.

Figure 6:
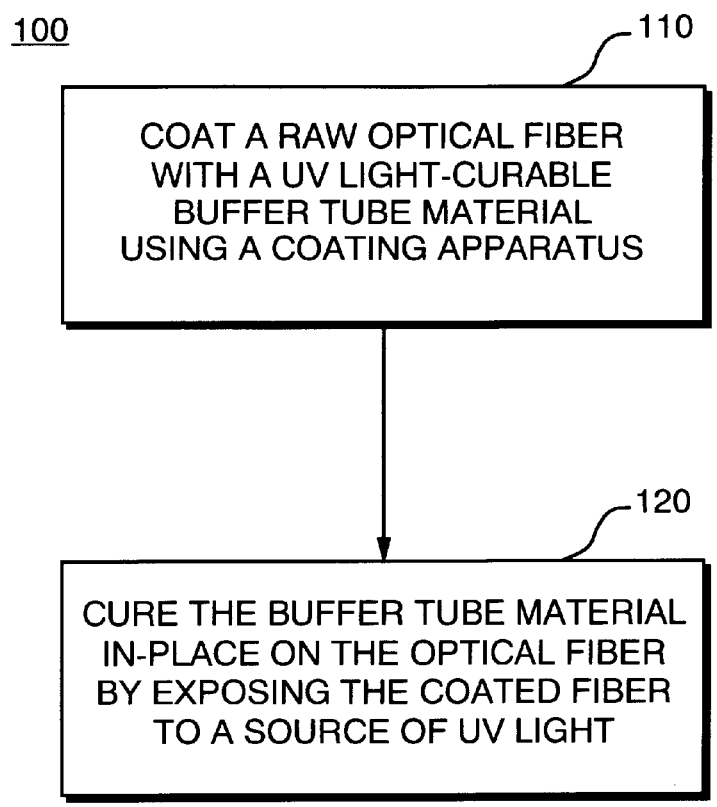
FIG. 6 is a flow chart of the method of manufacturing a tight-buffered optical fiber using a UV light-curable polymer matrix tight buffermaterial in accordance with the teachings of the present invention.

A method of manufacturing tight-buffered optical fibers utilizing the UV light-curable tight buffer material disclosed herein is shown in FIG. 6. The method 100 comprises coating an optical fiber with a UV light-curable tight buffermaterial, step 110, and curing the material in-place on said optical fiber by exposing the coated optical fiber to a source of UV light, step 120. The tight buffermaterial may be applied using any one of a number of common coating apparatuses, such as die coating or "foaming" devices, which apply a predetermined thickness of the material onto the optical fiber.

Figure 7:
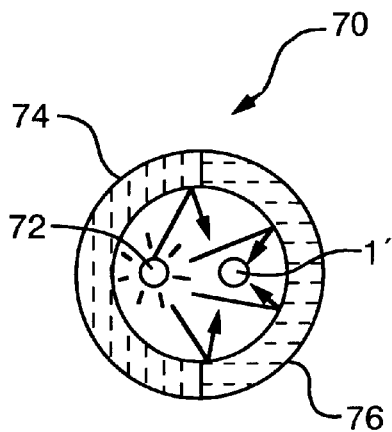
FIG. 7 is a cross section of an ultra violet (UV) light source, which is used in a curing station for curing tight buffermaterials in-place on optical fibers in accordance with the teachings of the present invention.

In order to effect the rapid through cure of the UV light-curable tight buffermaterial, a high intensity UV light source must be utilized at the curing station. Light sources with outputs of substantially between 350 and 400 nm are preferable to allow for maximum depth of cure while, at the same time, eliminating ambient cure due to exposure to visible light. Furthermore, the use of Fusion "D" bulbs produced by Fusion Systems of Gaithersburg, Md, in the orientation shown in FIG. 7 are preferable to provide 360° exposure of the coated optical fiber. In FIG. 7, a single Fusion D UV light source 70, having a lamp 72 located at a first focus of a first integral, elliptical reflector 74 is provided in conjunction with a second elliptical reflector 76. After coating the optical fiber, the coated fiber 1 prime passes through the focus of the second elliptical reflector 76. The reflectors are oriented such that their respective second foci are substantially co-located with the first focus of the opposite reflector. Thus, this arrangement will provide substantially uniform 360° exposure to the tight buffermaterial after it is applied to the optical fiber.

Modifications and substitutions by one of ordinary skill in the art are considered to be within the scope of the present invention which is not to be limited except by the claims which follow.

What is claimed is:

1. A tight buffered optical fiber coating comprising an ultra-violet (UV) light curable coating, said coating applied around the circumference of an optical fiber and cured thereon at rates of speed in excess of 100 meters per minute, wherein said optical fiber is non-colored and wherein said UV light-curable polymer coating is pigmented to color-code said optical fiber to aid in fiber identification.

2. A tight-buffered optical fiber comprising an optical fiber, said optical fiber having a glass core for transmitting optical signals, a glass cladding surrounding said core for refracting said optical signals into said core, a primary coating comprising a highly elongatable material having a low tensile strength to distribute stresses around said optical fiber cladding, and a color-coded secondary coating, which provides abrasion resistance and handling characteristics to said primary coating and which aids in fiber identification, and a tight buffer circumferentially encapsulating said optical fiber, said tight buffer comprising a substantially transparent ultra violet (UV) light curable polymer matrix coating wherein said secondary coating is color-coded to aid in fiber identification and wherein said UV light-curable polymer coating to allow said color-coded secondary coating to be seen through said UV light-curable polymer coating.

3. The tight-buffered optical fiber as claimed in claim 2, wherein said UV light-curable polymer coating comprises:

a. substantially between 45 and 65 weight percent of a flexible urethane acrylate;

b. substantially between 12 and 25 weight percent of a substantially monofunctional cyclic acrylate ester;

c. substantially between 8 and 16 weight percent dipropylene glycol diacrylate;

d. substantially between 3 and 5 weight percent propoxylated trimethylol propane triacrylate;

e. substantially between 1 and 5 weight percent of a UV light-curable photo-initiator;

f. substantially between 0.0 and 1 weight percent of an anti-oxidant; and g. substantially between 0.5 and 3 weight percent of a UV stabilizer to prevent yellowing of said polymer coating.

4. The tight-buffered optical fiber as claimed in claim 3 further comprising a UV light-curable silicone release compound.

5. The tight-buffered optical fiber as claimed in claim 4, wherein said UV light curable silicone release compound comprises EB 350.

6. The tight-buffered optical fiber as claimed in claim 3 further comprising between 2 and 5 weight percent tripropylene glycol triacrylate.

7. The tight-buffered optical fiber as claimed in claim 3 wherein said anti-oxident comprises IRGANOX 1076.

8. The tight buffered optical fiber as claimed in claim 3 wherein said UV stabilizer comprises TINUVIN 292.

* * * * *